United States Patent
Shah

(10) Patent No.: US 12,167,381 B2
(45) Date of Patent: Dec. 10, 2024

(54) SYSTEM AND METHOD OF USING CHANNELIZATION IN A WIRELESS NETWORK

(71) Applicant: ITRON, INC., Liberty Lake, WA (US)

(72) Inventor: Kunal Pankaj Shah, Mountain View, CA (US)

(73) Assignee: ITRON, INC., Liberty Lake, WA (US)

( * ) Notice: Subject to any disclaimer, the term of this patent is extended or adjusted under 35 U.S.C. 154(b) by 221 days.

(21) Appl. No.: 17/135,478

(22) Filed: Dec. 28, 2020

(65) Prior Publication Data

US 2021/0298019 A1 Sep. 23, 2021

Related U.S. Application Data

(60) Provisional application No. 62/991,017, filed on Mar. 17, 2020.

(51) Int. Cl.
*H04W 72/0453* (2023.01)
*H04W 72/20* (2023.01)
*H04W 84/18* (2009.01)

(52) U.S. Cl.
CPC ....... *H04W 72/0453* (2013.01); *H04W 72/20* (2023.01); *H04W 84/18* (2013.01)

(58) Field of Classification Search
CPC ......... H04W 72/0453; H04W 72/0406; H04W 84/18; H04W 72/20
See application file for complete search history.

(56) References Cited

U.S. PATENT DOCUMENTS

| 5,515,369 | A | * | 5/1996 | Flammer, III | H04B 1/715 370/480 |
| 10,863,426 | B2 | * | 12/2020 | Tao | H04W 48/16 |
| 2009/0047920 | A1 | * | 2/2009 | Livsics | H04B 1/719 455/226.1 |
| 2012/0147783 | A1 | * | 6/2012 | Shaffer | H04W 4/50 370/254 |
| 2014/0064199 | A1 | | 3/2014 | Pan et al. | |

(Continued)

OTHER PUBLICATIONS

Bradner, S., "Key words for use in RFCs to Indicate Requirement Levels", BCP 14, RFC 2119, Retrieved from http://www.rfc-editor.org/info/rfc2119, DOI: 10.17487/RFC2119, Mar. 1997, 3 pages.

(Continued)

*Primary Examiner* — Jasper Kwoh

(74) *Attorney, Agent, or Firm* — Artegis Law Group, LLP

(57) ABSTRACT

Various embodiments disclose a method for transmitting data between node devices in a mesh network. The method includes a first node device a channel mask that specifies a set of channels that are available for a channel plan within an operating region associated with the mesh network. The first node device supports a set of channel plans. Based on the channel mask, the first node device determines a set of available channels supported by the first node device. The first node device selects from the set of available channels, at least one channel as a first preferred channel for data transmissions between the first node and a second node included in the mesh network. The first node device configures, based on the first preferred channel, a communication link between the first node device and the second node device.

18 Claims, 5 Drawing Sheets

(56) References Cited

U.S. PATENT DOCUMENTS

| | | | |
|---|---|---|---|
| 2014/0242936 A1* | 8/2014 | Seely ................. | H04L 27/10 |
| | | | 455/307 |
| 2016/0080793 A1* | 3/2016 | Ruffini ............... | H04N 21/8586 |
| | | | 725/34 |
| 2017/0366329 A1* | 12/2017 | Cao .................... | H04W 72/0453 |
| 2018/0255495 A1* | 9/2018 | Dietrich ............... | H04W 72/54 |
| 2018/0270821 A1 | 9/2018 | Griesdorf et al. | |
| 2019/0124465 A1 | 4/2019 | Ludlow | |
| 2019/0159205 A1* | 5/2019 | Mercier ............ | H04W 72/0453 |
| 2019/0253296 A1 | 8/2019 | Chen et al. | |
| 2019/0289536 A1* | 9/2019 | Tao ....................... | H04W 48/16 |
| 2020/0021969 A1 | 1/2020 | Uhling et al. | |
| 2021/0218526 A1* | 7/2021 | Zhang .................. | H04L 5/0048 |

OTHER PUBLICATIONS

Leiba, B., "Ambiguity of Uppercase vs Lowercase in RFC 2119 Key Words", BCP 14, RFC 8174, DOI 10.17487/RFC8174, Retrieved from http://www.rfc-editor.org/info/rfc8174, May 2017, 4 pages.

IEEE Standard 802.15.4, "IEEE Standard for Low-Rate Wireless Networks", IEEE Standard Association, Dec. 2015, 709 pages.

IEEE 802.15, "IEEE 802.15 Assigned Numbers Authority", Retrieved from https://www.ieee802.org/15/ANA.html, on Oct. 26, 2021, 2 pages.

IEEE, "IEEE 802.15 ANA Database", Retrieved from https://mentor.ieee.org/802.15/documents?is_dcn=257&is_group=000, on Oct. 27, 2021, 2 pages.

IEEE, "IEEE 802.15 Operations Manual", Retrieved from https://mentor.ieee.org/802.15/documents?is_dcn=235&is_group=000, on Oct. 26, 2021, 2 pages.

Montenegro et al., "Transmission of IPV6 Packets over IEEE 802.15.4 Networks", Retrieved from http://www.rfc-editor.org/info/rfc4944, DOI 10.17487/RFC4944, RFC 4944, Sep. 2007, 30 pages.

Narten et al., "Guidelines for Writing an IANA Considerations Section in RFCs", Retrieved from http://www.rfc-editor.org/info/rfc5226, DOI 10.17487/RFC5226, BCP 26, RFC 5226, May 2008, 27 pages.

Singapore Search Report for Application No. 10202102545Y dated Oct. 27, 2022.

\* cited by examiner

400

| Mode # | Data Rate (bps) | Modulation |
|---|---|---|
| 0 | 50K | 2 FSK |
| 1 | 100K | 2 FSK |
| 2 | 150K | 2 FSK |
| 3 | 300K | 2 FSK |
| 6 | 150K | OFDM 4 |
| 7 | 200K | OFDM 4 |
| 8 | 300K | OFDM 4 |
| 9 | 600K | OFDM 3 |
| 10 | 800K | OFDM 1 |
| 11 | 1200K | OFDM 1 |
| 12 | 2400K | OFDM 1 |

| Mode in Use | Mode # |
|---|---|
| Default | 2 |
| 1 | 3 |
| 2 | 9 |

FIG. 4B

SYSTEM AND METHOD OF USING CHANNELIZATION IN A WIRELESS NETWORK

CROSS-REFERENCE TO RELATED APPLICATIONS

This application claims priority benefit of the U.S. Provisional Patent Application titled, "SYSTEM AND METHOD OF USING CHANNELIZATION IN A WIRELESS NETWORK," filed on Mar. 17, 2020 and having Ser. No. 62/991,017. The subject matter of this related application is hereby incorporated herein by reference.

BACKGROUND

Field of the Various Embodiments

The various embodiments relate generally to mesh networks and communications across mesh network and, more specifically, to systems and methods of using channelization in a wireless network.

Description of the Related Art

A wireless mesh network includes a plurality of nodes that are configured to communicate with and transmit data to one another using one or more communication protocols. In lieu of using a hierarchal topology, individual nodes within a wireless mesh network establish direct connections with other nodes within the network in order to efficiently route data to different locations in the network. The different nodes within a wireless mesh network usually implement various techniques to route data through the network. For example, a given node could identify neighboring nodes within the network and establish communication links with (or "pair" with) some or all of those neighboring nodes. Once the given node forms communication links with neighboring nodes, the given node can route data within the network via one or more of those communication links.

A given wireless mesh network typically includes nodes that have varying capabilities and operating parameters. For example, a given operating region (e.g., North America, Brazil, China, Japan, Europe, etc.) may support multiple communication modes that have varying operating characteristics. In such instances, multiple nodes can transmit communications using different portions of the spectrum ("channels") without interfering with other messages. In order to enable effective operating using multiple channels with the operating region, a definition for the channelization of the spectrum within a given operating region or network is required. A given operating region therefore includes one or more channel plans that define operating modes and/or operating characteristics for channels that are allowed and used within the operating region.

One drawback of conventional wireless mesh networks is that nodes included in the mesh network have channelization definitions hardcoded during initial manufacturer. However, when a new operating mode is defined to be used within an operating region, a new channel plan definition needs to be added to the channelization definition. In such instances, each node must be updated to include the new definition that includes the new channel plan, as well as any new characteristics or metrics associated with updating the new channelization definition. As a result, the updated channelization definition may be split and may need the node to reconstruct a new channelization definition, making the selection of a specific channel overly-complex and processor intensive, as to the full definition of any given channel grows in complexity as more definitions are added. Consequently, the complex process to select a channel inhibits the overall operating efficiency of the network and can preclude the network from being able to handle certain applications or communications protocols that would otherwise be introduced into an operating region.

As the foregoing illustrates, what is needed in the art are more effective ways to control communications between nodes within a mesh network.

SUMMARY

Various embodiments disclose a computer-implemented method for transmitting data between node devices in a mesh network comprising acquiring, by a first node device within the mesh network that supports a set of channel plans, a channel mask that specifies a set of channels that are available for a channel plan within an operating region associated with the mesh network, determining, based on the channel mask, a set of available channels supported by the first node device, selecting, from the set of available channels, at least one channel as a first preferred channel for data transmissions between the first node device and a second node device included in the mesh network, and configuring, based on the first preferred channel, a communication link between the first node device and the second node device.

One technical advantage of the disclosed techniques relative to the prior art is that the channelization for a given operating region does not need to be redefined as new communication modes and operating modes are introduced into a given region. In particular, by maintaining and updating channel masks that are applicable to a specific operating region, a communication node device can determine specific channels and operating modes to use within a specific operation region without needing to redefine channel plans or continually download more complex channel plan information.

Further, applying separate, updated channel masks enables a communication node device to maintain channel plan information for multiple operating regions while efficiently selecting specific channels and communication modes that are currently in use in a specific operating region and based on operating conditions associated with the mesh network. Maintaining default channelization information enables communication node devices to be implemented in a broad range of locations without requiring a large investment in initial setup. Accordingly, the overall operating efficiency of the mesh network can be substantially increased relative to conventional mesh networks. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 4A illustrates the contents of a capabilities information element generated by a node device within the network system of FIG. 1, according to various embodiments;

FIG. 4B illustrates contents a mode shift information element generated by a node device within the network system of FIG. 1, according to various embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
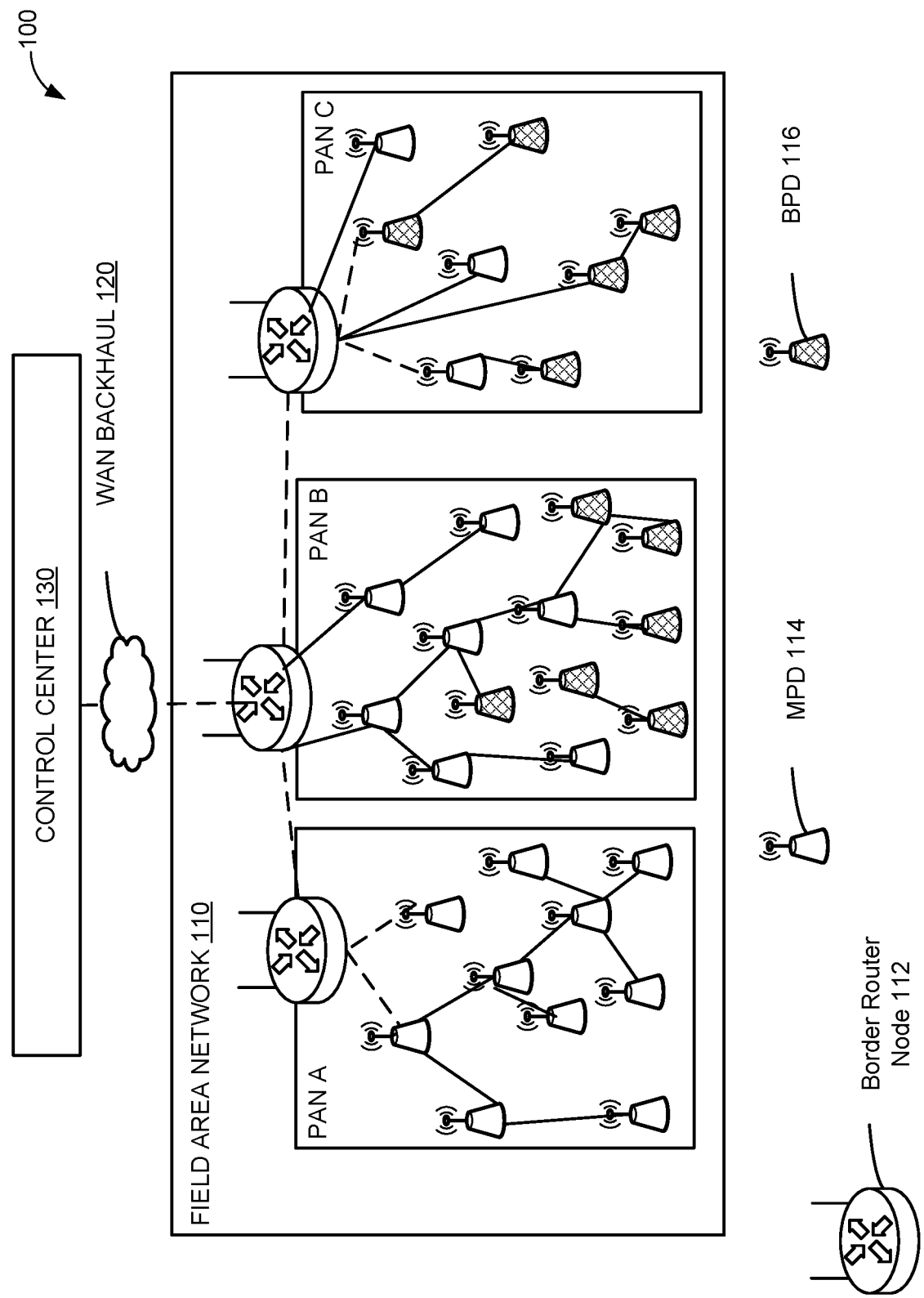
FIG. 1 illustrates a network system configured to implement one or more aspects of the various embodiments.

FIG. 1 illustrates a network system configured to implement one or more aspects of the various embodiments. As shown, network system 100 includes field area network (FAN) 110, wide area network (WAN) backhaul 120, and control center 130. FAN 110 is coupled to control center 130 via WAN backhaul 120. Control center 130 is configured to coordinate the operation of FAN 110.

FAN 110 includes personal area network (PANs) A, B, and C. PANs A and B are organized according to a mesh network topology, while PAN C is organized according to a star network topology. Each of PANs A, B, and C includes at least one border router node device 112 and one or more mains-powered device (MPD) node devices 114. PANs B and C further include one or more battery-powered device (BPD) node devices 116.

MPD node devices 114 draw power from an external power source, such as mains electricity or a power grid. MPD node devices 114 typically operate on a continuous basis without powering down for extended periods of time. BPD node devices 116 draw power from an internal power source, such as a battery or other local source (e.g., solar cell, etc.). BPD node devices 116 typically operate intermittently and, in some embodiments, may power down for extended periods of time in order to conserve battery power. MPD node devices 114 and/or BPD node devices 116 are configured to gather sensor data, process the sensor data, and communicate data processing results and/or other information to control center 130. Border router node devices 112 operate as access points that provide MPD node devices 114 and BPD node devices 116 with access to control center 130.

Any of border router node devices 112, MPD node devices 114, and/or BPD node devices 116 are configured to communicate directly with one or more adjacent node devices via bi-directional communication links. In various embodiments, a given communication link may be wired or wireless links, although in practice, adjacent node devices of a given PAN exchange data with one another by transmitting data packets via wireless radio frequency (RF) communications. The various node types are configured to perform a technique, known in the art as "channel hopping," in order to periodically receive data packets on varying channels. As known in the art, a "channel" may correspond to a particular range of frequencies. In one embodiment, a node device may compute a current "receive" channel by evaluating a Jenkins hash function that is based on a total number of channels, the media access control (MAC) address of the node device, and/or other information associated with the node device.

In various embodiments, a definition for the channelization of the spectrum for FAN 110 and/or a given operating region (e.g., the North America operating region, the Brazil operating region, etc.) is required in order to enable effective operation of node devices 112, 114, 116. A given operating region or a FAN 110 within a specific operating region has an associated channel plan that defines operating modes and/or operating characteristics (e.g., frequency band, channel spacing, center channel frequency, etc.) that are allowed within the operating region and/or FAN 110. In some embodiments, when a new operating mode is defined within the operating region, a new physical (PHY) layer definition may be added to the channelization definition. In such instances, the additional definition may make the selection by the node device 112, 114, 116 of a specific channel complex, due to the full definition of a given channel growing in complexity.

In various embodiments, one or more components of FAN 110 may incorporate various optimized channelization techniques in order to determine channels that are available for use within an operating region and which a given node device 112, 114, 116 is capable of supporting. Upon determining available channels that the given node device 112, 114, 116 is capable of supporting, the given node device 112, 114, 116 may select at least one of the supported channels to enable communications with other node devices. For example, a given node device 112, 114, 116 may implement various techniques that use, for a given operating region, a combination of defined channel plans and a channel mask (which identifies which channels in a given operating region are used) in order to determine supporting operating modes for the operating region. Upon determining the set of supporting operating modes, a given node device 112, 114, 116 may compare the parameters of a supporting operating mode with the capabilities of the given node device 112, 114, 116 and may then select a supported operating mode of which the given node device 112, 114, 116 has the capability of operating. The given node device 112, 114, 116 may send messages to other node devices within FAN 110 that include a channel mask that corresponds to the selected operating mode.

In various embodiments, each node device 112, 114, 116 within a given PAN may implement a discovery protocol to identify one or more adjacent node devices or "neighbors." In such instances, a given node device 112, 114, 116 that has identified an adjacent, neighboring node device may establish a bi-directional communication link with the neighboring node device. Each neighboring node device may update a respective neighbor table to include information concerning the other node device, including the MAC address of the other node device, as well as a received signal strength indication (RSSI) of the communication link established with that node device. In various embodiments, the neighbor table may include information about one or more communication modes that the neighbor mode is capable of supporting, such as the operating parameters (e.g., data rates, modulation scheme, channel spacing, frequencies supported, etc.) for each of the respective operating modes. In some embodiments, the neighbor table may include the channel plan(s) and/or the channel mask(s) for the operating region in which FAN 110 is located.

In various embodiments, node devices 112, 114, 116 may compute the channel hopping sequences of adjacent node devices in order to facilitate successful transmission of data packets to such node devices. In embodiments where node devices 112, 114, 116 implement the Jenkins hash function, a node device 112 may compute a "current receive" channel of an adjacent node device using the total number of channels, the MAC address of the adjacent node device, and/or a time slot number assigned to a current time slot of the adjacent node device.

Any of the node devices 112, 114, 116 discussed above may operate as a source node device, an intermediate node device, or a destination node device for the transmission of data packets. In some embodiments, a given source node device may generate a data packet and then transmit the data packet to a destination node device via any number of intermediate node devices (in mesh network topologies). In such instances, the data packet may indicate a destination for the packet and/or a particular sequence of intermediate node devices to traverse in order to reach the destination node device. In some embodiments, each intermediate node device may include a forwarding database indicating various network routes and cost metrics associated with each route.

Node devices 112, 114, 116 transmit data packets across a given PAN and across WAN backhaul 120 to control center 130. Similarly, control center 130 transmits data packets across WAN backhaul 120 and across any given PAN to a particular node device 112, 114, 116 included therein. As a general matter, numerous routes may exist which traverse any of PANs A, B, and C and include any number of intermediate node devices, thereby allowing any given node device or other component within network system 100 to communicate with any other node device or component included therein.

Control center 130 includes one or more server machines (not shown) configured to operate as sources for, and/or destinations of, data packets that traverse within network system 100. In various embodiments, the server machines may query node devices within network system 100 to obtain various data, including raw and/or processed sensor data, power consumption data, node/network throughput data, status information, and so forth. The server machines may also transmit commands and/or program instructions to any node device 112, 114, 116 within network system 100 to cause those node devices to perform various operations. In one embodiment, each server machine is a computing device configured to execute, via a processor, a software application stored in a memory to perform various network management operations.

Figure 2:
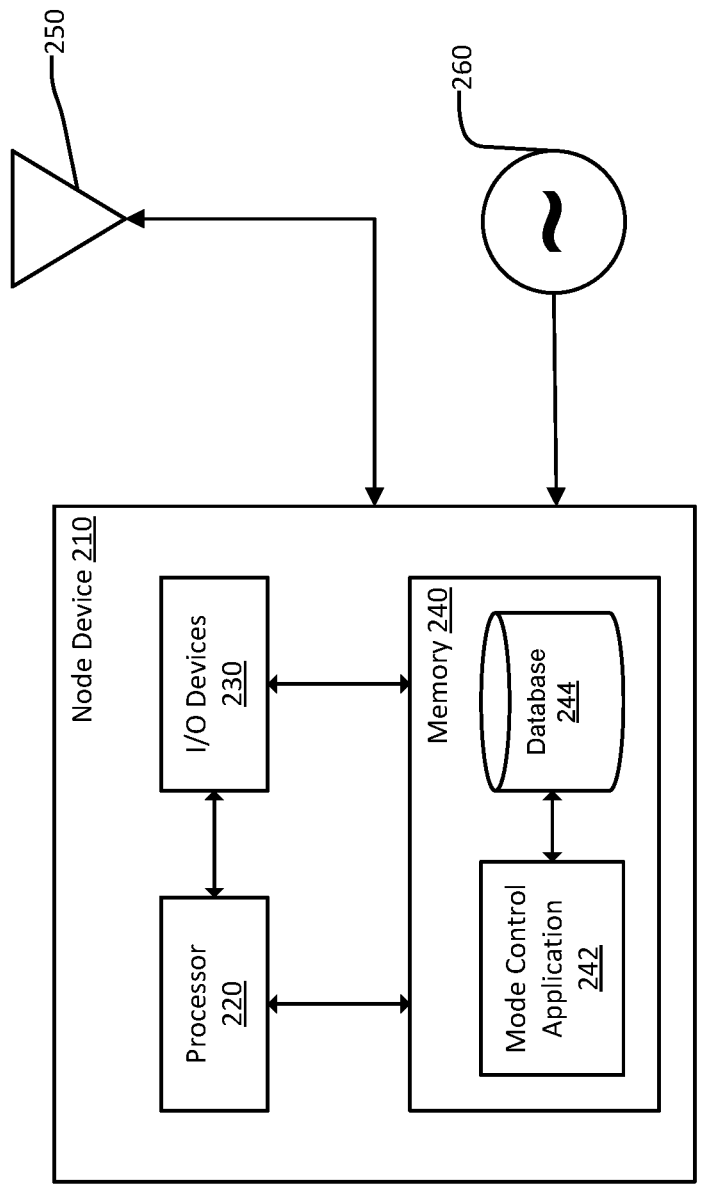
FIG. 2 illustrates a node device configured to transmit and receive data within the network system of FIG. 1, according to various embodiments.

In various embodiments, node devices 112, 114, 116 may likewise include computing device hardware configured to perform processing operations and execute program code. Each node device may further include various analog-to-digital (A/D) converters, digital-to-analog (D/A) converters, digital signal processors (DSPs), harmonic oscillators, transceivers, and/or any other components generally associated with RF-based communication hardware. FIG. 2 illustrates an exemplary node device that may operate within the network system 100.

FIG. 2 illustrates a node device 210 configured to transmit and receive data within the network system of FIG. 1, according to various embodiments. As shown, node device 210 is coupled to transceiver 250 and oscillator 260. Node device 210 includes processor 220, input/output devices 230, and memory 240. Memory 240 includes one or more applications (e.g., mode control application 242) that communicate with database 244.

Transceiver 250 is connected to node device 210 and is configured to transmit and/or receive data packets and/or other messages across network system 100 using a range of channels and power levels. Oscillator 260 provides one or more oscillation signals, according to which, in some embodiments, node device 210 may schedule the transmission and reception of data packets. In some embodiments, node device 210 may be used to implement any of border router node devices 112, MPD node devices 114, and/or BPD node devices 116 of FIG. 1.

Node device 210 includes a processor 220, input/output (I/O) devices 230, and memory 240, coupled together. In various embodiments, processor 220 may include any hardware configured to process data and execute software applications. Processor 220 may include a real-time clock (RTC) (not shown) according to which processor 220 maintains an estimate of the current time. The estimate of the current time may be expressed in Universal Coordinated Time (UTC), although any other standard of time measurement can also be used. I/O devices 230 include devices configured to receive input, devices configured to provide output, and devices configured to both receive input and provide output. Memory 240 may be implemented by any technically-feasible computer-readable storage medium.

Memory 240 includes one or more software applications (e.g., mode control application 242) and database 244, coupled together. The one or more software applications includes program code that, when executed by processor 220, may performs any of the node-oriented computing functionality described herein. The one or more software applications may also interface with transceiver 250 to manage the transmission and/or reception of data packets and/or other messages across network system 100, where the transmission and/or reception is based on timing signals generated by oscillator 260. In various embodiments, memory 240 may be configured to store protocols used in communication modes, equations and/or algorithms for identifying metric values, constants, data rate information, mode tables, channel masks, channel plans, and other data used in identifying metric values, etc.

In operation, mode control application 242 implements various techniques to optimize communications with one or more linked node devices, such as a neighboring node device. In various embodiments, node device 210 may be configured to, using a plurality of different communication modes, transmit data messages to the linked node device and/or receive data messages from the linked node device by selecting one or more available channel(s) and a specific operating mode that is node device 210 is capable of supported and is also supported the linked node device.

A communication mode may be defined by one or more operating parameters, such as settings or characteristics that affect data transmissions made to or from node device 210, such as by varying in speed, bandwidth, protocol, technology used, etc. For example, node device 210 operating in a first communication mode could transmit data packets with a 100 kilobits-per-second (kbps) bandwidth using minimum shift keying (MSK), while node device 210 operating in a second communication mode could transmit data packets with a 300 kbps bandwidth using Gaussian minimum shift keying (GMSK). In various embodiments, mode control application 242 may select one or more particular communication modes (e.g., a "common mode set") from a plurality of possible communication modes that are available in the operating region and are supported by the node device 210 and the linked node device.

Channel Mask for Selecting Modes in an Operating Region

Figure 3:
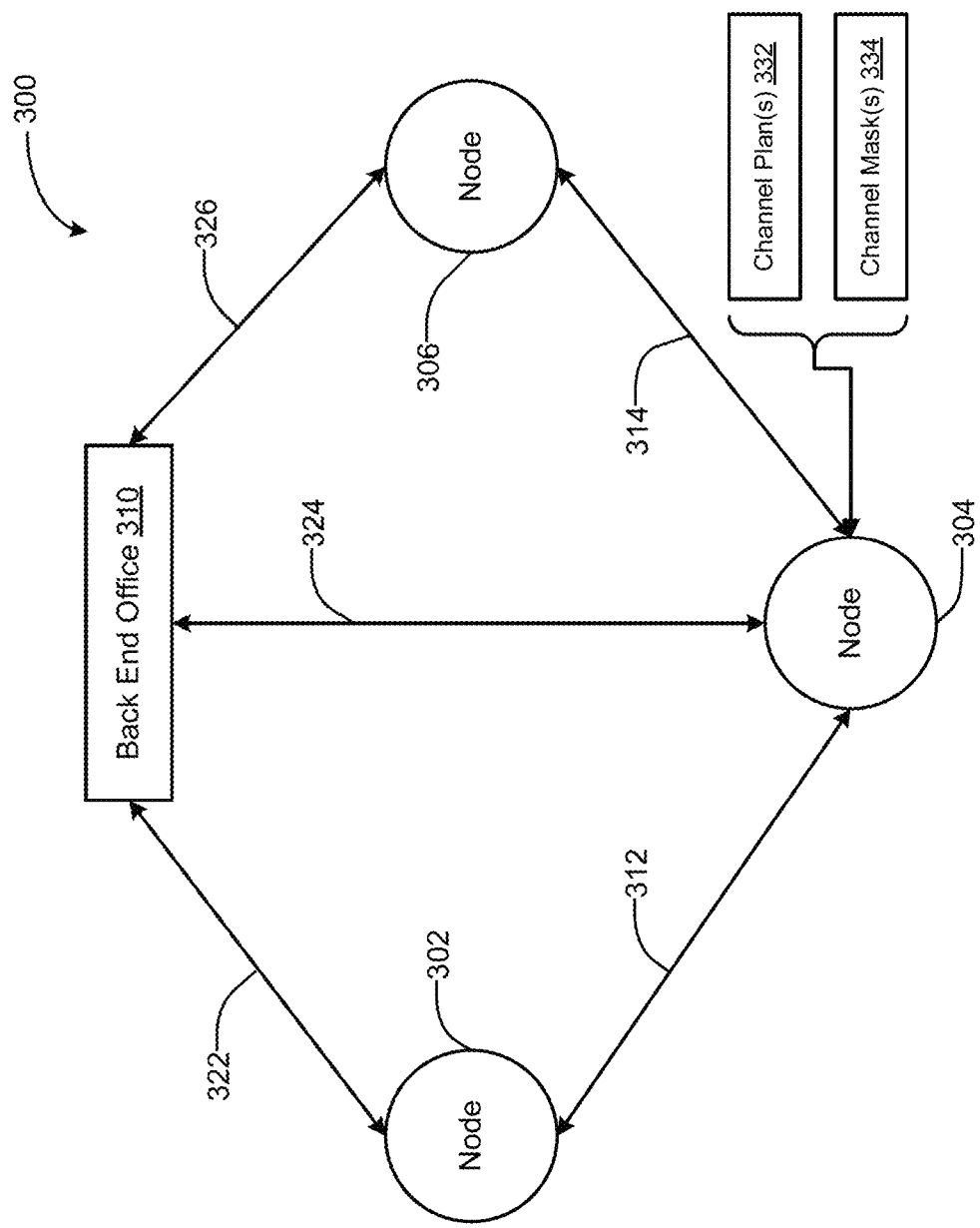
FIG. 3 illustrates how neighboring node devices within the network system of FIG. 1 establish communication links for transmitting data, according to various embodiments.

FIG. 3 illustrates how neighboring node devices within the network system of FIG. 1 establish communication links for data transmission, according to various embodiments. As shown, network 300 includes communication node devices 302, 304, 306 and back office system 310. Communication links 322, 324, 326 are established between communication node devices 302, 304, 306 and back office system 310. Communication links 312, 314 are established between communication node devices 302, 304, 306 for transmission of data packets from a source node device to a destination node device. Communication node device 304 includes channel plan(s) 332 and channel mask(s) 334.

In operation, a given communication node device 304 may establish a communication link 312 with a neighboring node device (e.g., node device 302) by selecting a communication mode that is supported by each node device 302, 304. In various embodiments, mode control application 242 may select the communication mode and a specific channel for the communication mode by applying a channel mask 334 to an applicable channel plan 332 in order to determine a plurality of candidate communication channels that are available for use. Mode control application 242 may evaluate various operating parameters and/or metric values associated with each of the candidate communication channels in order to select a specific communication channel and select a corresponding operating mode to transmit messages using the specific communication channel. In some embodiments, mode control application 242 may modify one or more operating parameters of a candidate communication channel (e.g., modify channel spacing, center frequency, etc.) in order to operate in a modified operating mode using the modified parameters.

In various embodiments, each communication mode and/or communication channel may be assigned a specific operating mode. The operating mode defines specific operating characteristics for communication, including channel characteristics, data rate, header format, modulation, etc. In various embodiments, each operating mode may be assigned as unique mode identifier (ID) within the operating region.

In some embodiments, the operating region may include one or more channel masks 324 that may be applied in order to mask one or more channels by identifying a set of channels within a given channel plan 332 as unavailable. The channel mask 334 identifies which channels of channel plan 332 within the operating region are available for use and identifies which channels of channel plane 332 are unavailable within the operating region. In some embodiments, communication node device 302, 304, 306 may be assigned a default mode, default channel plan 332, and/or a default channel mask 334 based on the operating region in which communication node device 304, 304, 306 is located. For example, during startup, communication node device 304 could receive a packet with a header that includes bits identifying the operating region ("region ID") and/or bits specifying a default operating mode ("default mode ID"), a default channel plan, and/or a default channel mask. Communication node device 304 could respond by beginning operation in the operating region by applying the default channel mask to the default channel plan to identify an available communication channel. Communication node device 304 may use the mode associated with the default mode ID to transmit and receive communications using the available communication channel. In some embodiments, communication node device 304 may receive a modified channel mask during startup. In such instances, communication node device 304 may select the modified channel mask in lieu of the default channel mask.

In various embodiments, each communication node device 302, 304, 306 may maintain a mode table that is stored in memory 240, database 244, and/or other suitable storage medium of communication node device 302, 304, 306. The mode table (not shown) is a data table used to store data regarding communication modes, including at least a plurality of communication modes that may be used by the communication node device 302, 304, 306. In various embodiments, the mode table may only store data for the communication modes usable by a given communication node device 304. For example, communication node device 302, 304, 306 may update the mode table upon applying the default channel mask. Additionally or alternatively, the mode table may store data for all communication modes, such as may be included in a global mode table. In such instances, communication node device 304 may apply a default channel mask or an updated channel mask for the operating region to determine a communication mode to use when establishing communication links 312, 314.

The mode table stores data associated with each of the communication modes a given communication node device 302, 304, 306 is capable of implementing. For example, data included in an entry for a given communication mode in the mode table could include one or more operating parameters of the given communication mode, as well as a data success rate indicative of successful transmissions that were made to and/or from the given node device using the given communication mode. In various embodiments, the mode table may also include a unique identifier (UID) associated with each communication mode. The UID may be any suitable type of value (e.g., numeric, alphanumeric, hexadecimal, etc.) that is unique to the specific communication mode among a plurality of all potential communication modes. In some embodiments, mode control application 242 may generate an updated channel mask in order to mask channels that are associated with unsuccessful transmissions to and/or from the given node.

In some embodiments, each of communication node devices 302, 304, 306 may communicate, either directly or indirectly (e.g., via one or more other communication node devices), with back office system 310 via communication links 322, 324, 326. Back office system 310 maintains a global mode table (not shown) for one or more communication node devices 302, 304, 306 included in network 300. In various embodiments, the global mode table may store data for each communication mode supported by any communication node device 302, 304, 306 in network 300. In some embodiments, a communication node device 306 may only locally store data for communication modes through which the communication node device 306 may communicate. In other embodiments, each communication node device 302, 304, 306 may locally store the global mode table, where each node device 302, 304, 306 receives the global mode table from back office system 310 and/or receives updates to the global mode table from back office system 310 via communication links 322, 324, 326. Additionally or alternatively, back office system 310 may store the channel plans 332 and/or the channel masks 322 associated with the operating region and/or network 300. In such instances, each communication node device 302, 304, 306 may acquire the stored channel plans 332 and/or the stored channel masks 334 from back office system 310 when selecting a specific operating mode to implement.

In various embodiments, a given communication node device 304 may identify, from a set of all communication modes, one or more communication modes that are: (i) operating in the operating region, and (ii) supported by a given neighboring communication node device 302. Communication node device 304 may group the set of commonly-supported communication modes to generate a common mode set.

Communication node device 304 may then select, from the common mode set, one or more communication modes (e.g., a "selected mode set") that are to be used when communicating with a neighboring communication node device 302, 304, 306.

For example, when establishing communication link 312 with neighboring communication node device 302, communication node device 304 could use entries included in the local mode table to identify each communication mode that is supported by neighboring communication node device 302. In some instances, communication node device 304 could determine a metric value for each of the supported communication modes. In such instances, communication node device 304 could use the metric values for evaluation when selecting the communication modes that are be used for communication link 312.

In some embodiments, when establishing a communication link 312, 314 for data transmission, each communication node device 302, 304, 306 may initially transmits messages with other communication node devices using a default communication mode ("default mode"). The default mode may act as a baseline channel plan 332, channel mask 334, and operating mode for the communication node devices 302, 304, 306 included in network 300. In such instances, discovery communications, a broadcast schedule, and/or a listening schedule may adhere to the default mode.

In various embodiments, node device 304 may discover neighboring communication node devices 302, 306 and may establish a communication link 312, 314 with the neighboring communication node devices 302, 306. In such instances, communication node device 304 and the linked communication node device 302, 306 may implement multi-data-rate communications to in order to achieve better link statistics by increasing or decreasing the data rate of communications between the respective communication node devices 302, 304, 306. In such instances, communication node devices 302, 304, 306 may generate updated channel masks (e.g., allowing channels 2-50) that differs from the default channel plan (e.g., allowing channels 0-63) of the operating region in order to reflect the use of multiple channels to support the change in data rate and may transmit the updated channel mask to the other communication node devices. Additionally or alternatively, communication node devices 302, 304, 306 may generate updated channel mask to optimize channel usage (e.g., masking heavily-used or slow channels), avoid interfering channels that are in use, and/or meet regulatory guidelines (e.g., regulations requiring elimination of certain band edge channels).

In some embodiments, mode control application 242 may include capabilities information in messages to one or more neighboring node devices. For example, communication node device 304 could include one or more information elements (IEs) in messages, where the information IE allows communication node device 304 to include additional information with various messages, such as data messages, acknowledgement messages, and/or discovery frames.

In one example, communication node device 304 could discover communication node device 302 as a new neighboring communication node device. In some instances, communication node device 304 could electronically transmit to communication node device 302, using the default mode, at least the UID for each communication mode supported by communication node device 304. For example, communication node device 304 could include channel IDs of supported channel plans 332 as specific type-length-value (TLV) sequences (e.g., numeric, alphanumeric, hexadecimal, etc.) that are included in a header of a message that is sent to neighboring communication node device 302. In some instances, communication node device 304 could receive a message originating from communication node device 302, where the message includes the UID for each communication mode supported by communication node device 302 and one or more updated channel masks 334. In some instances, communication node devices 302, 304, could also exchange UIDs for communication modes that each respective communication node device 302, 304 could use for listening (e.g., receiving data messages, even if the communication mode is not used to transmit data messages), channels on which the communication node devices 302, 304 may operate, as well as data indicating if the communication node device 302, 304 supports any particular technology, protocol, etc., which may be used in communications.

After the data has been exchanged, each of the communication node devices 302, 304 stores the data received from the other communication node device in local memory. For example, communication node device 304 could store the UIDs of communication modes that are supported by communication node device 302 in a local mode table, and may store a set of updated channel masks 334 that could be applied to one or more channel plans 332. In some embodiments, communication node device 304 may identify a metric value for each communication mode that is supported by neighboring communication node device 302.

In various embodiments, each of communication node devices 302, 304, 306 may include a channelization table (not shown) in database 244 during manufacture. In some embodiments, one or more channel masks and/or channelization tables may be loaded onto communication node device 302, 304, 306 during an initial production of the device or during an initialization process upon startup. The channelization table may be created using various optimized channelization algorithms in order to define channel characteristics for various channel plans 332 in one or more operating regions. In such instances, a given communication node device 304 may receive messages during startup that indicate the operating region and/or a specific channel plan identifier (channel plan ID) being used in the operating region. Communication node device 304 may then use a channel included in the selected channel plan 332 for communications.

For example, communication node device 304 could store a channelization table that was generated to include channel plan information for multiple operating regions. The channelization table provides certain characteristics of a given channel plan 332 that is applicable to one or more operating regions, the given channel plan 332 including a channel plan ID, an operating frequency band, a center channel frequency, and a channel spacing value. The channelization table may also provide characteristics of channel masks 334 in different regions ("channel utilization"), specifying the specific channels marked as usable by the applicable channel mask 334 in specific regions.

For example, Table 1 is a channelization table that could be included in communication node device 304. The channelization table includes channel plan characteristics for different channel plans and, for each channel plan, lists the corresponding available channels in the North America (NA) region and the Hong Kong (HK) region, among other regions.

TABLE 1

Channel Characteristics Table for Multiple Regions

| Channel Plan ID | Frequency band | Channel spacing | Channel center frequency | Channel utilization NA | HK | [Other regions] |
|---|---|---|---|---|---|---|
| 1 | 902_928 | 200 kHz | 902.2 | 0, 1, 2, 3 . . . | 90, 91, 92, 93 . . . | . . . |
| 2 | 902_928 | 400 kHz | 902.4 | 0, 1, 2, 3 . . . | 45, 46, 47 . . . | . . . |
| 3 | 902_928 | 800 kHz | 902.8 | 0, 1, 2, 3 . . . | 22, 23, 24 . . . | . . . |
| 4 | 902_928 | 50 kHz | 902.05 | 0, 1, 2, 3 . . . | 400, 401, 402 . . . | . . . |
| 5 | . . . | . . . | . . . | . . . | . . . | . . . |

In various embodiments, communication node device 304 may acquire, for one or more channel plans 332, a corresponding channel mask 334 specifying the channels that are available for the channel plan(s) 332 in one or more operating regions. A channel mask 334 for a given operating region may indicate which channels within a given channel plan 332 are used within that operating region.

For example, for each operating region where the channel center frequency is uniquely defined, a channel plan 332 could be assigned a channel plan ID and a set of channel plan parameters. In such instances, the channel plan parameters could be used to specify the channel numbers within the channel plan 332, and the channel mask 334 identifies the specific channel numbers that are being are used within the specific operating region. Communication node device 304 may then apply channel mask 334 in order to select a channel that is both: (i) available within the operating region that communication node device 304 located, and (ii) has channel characteristics that communication node device 304 is capable of supporting. In some embodiments, communication node device 304 may acquire an updated channel mask that identifies a different set of channel numbers that are available for use within the specific operating region. In such instances, communication node device 304 may apply the updated channel mask to select a channel based on the updated operating conditions.

For example, Table 2 shows different channel masks 324 for a given operating region. The channel mask for region 1 identifies channels 5-7 while masking channels 0-4. The channel mask for region 2 includes two channel masks, with one mask identifying channels 0 and 2-3 as available (and masking channel 1), and a separate channel mask identifying channels 4 and 7 (and masking channels 5-6). The channel mask can be written in various forms (e.g., numeric, alpha-numeric, hexadecimal, etc.) to reflect bits for multiple channels.

For example, the channel mask for region 1 may be written in hexadecimal, with the "7" value representing the "0111" bits for channels 4-7, while the channel mask for region 2 having the "B" value representing "1011" for channels 0-3. Other representations for the mask are possible, such as "0" bits identifying available channels and "1" bits masking other channels. In other embodiments, the channel numbers may be identified in descending order, with channels 7-4 being identified using a "1110" bit sequence and being represented with an "E" hexadecimal value in a channel mask.

TABLE 2

Channel Masks for Regions 1 and 2

| Channel Number | 0 | 1 | 2 | 3 | 4 | 5 | 6 | 7 |
|---|---|---|---|---|---|---|---|---|
| Channels supported for region 1 | 0 | 0 | 0 | 0 | 0 | 1 | 1 | 1 |
| Mask for region 1 | | | 0 | | | | 7 | |
| Channels supported for region 2 | 1 | 0 | 1 | 1 | 1 | 0 | 0 | 1 |
| Mask for region 2 | | | B | | | | 9 | |

In various embodiments, communication node device 304 may determine an applicable channel to select for use from the set of channels identified as available via channel mask 334. For example, communication node device 304 could initially apply channel mask 334 to one or more channel plans 332 in order to determine, for a given channel plan, the available channels for that channel plan within the operating region, with which communication node device 304 can operate. Upon determining a set of available channels, communication node device 304 may select one or more specific channels from the set of available channels in order to communicate with another communication node device 302, 306.

In various embodiments, one or more metric values associated with the transmission of messages between communication node devices 302, 304, 306 may be determined by mode control application 242. Such metrics may include, for example, a data success rate for a given communication mode. In some embodiments, the data success rate may be an estimate based on communications of node device 304 with other node devices (e.g., node device 306), data received from back office system 310, and/or other considerations. Additionally or alternatively, the data success rate may initially be a computed estimate based on earlier communications, and node device 304 may then update the data success rate based on exchanged communications with neighboring communication node device 302 that used the applicable communication mode.

Upon computing metrics values for the supported modes, mode control application 242 selects one or more preferred communication modes and/or specific communication channels for future communications. In such instances, mode control application 242 may generate an updated channel mask to reflect the determinations associated with the computed metric values.

For example, mode control application 242 could compare metric values associated with each respective communication mode included in a common mode set, where each mode included in the common mode set is a communication mode supported by both node device 304 and node device 302. Mode control application 242 could then, based on the comparison of metric values, select one or more communication modes and/or communication channels from the common mode set. Selection of the one or more communication modes and/or communication channels generates a selected mode set, where at least one communication mode and/or communication channel in the selected mode set is a preferred communication mode and/or a preferred communication channel that is to be used for transmitting subsequent data packets between communication node device 304 and communication node device 302.

In some embodiments, mode control application 242 may select a supported communication mode that is associated with the lowest identified metric value. For example, mode control application 242 could select, as the preferred communication mode, the communication mode that yields the lowest metric value. In instances where each of node device 304 and node device 302 separately identify different communication modes as respective preferred communication modes, communication node devices 302, 304 could determine that the communication node device that initiates the communication (e.g., communication node device 304) selects the communication mode for communication link 312.

In various embodiments, communication node device 304 may switch among communication modes and/or communication channels when communicating with various other communication node devices 302, 306 in network 300. For example, mode control application 242 could select a first communication mode (e.g., a mode and channel capable of a 1 Megabit-per-second (Mbps) data rate) for communication link 312, and a second communication mode (e.g., a mode and channel capable or a 300 kbps data rate) for communication link 314. This could occur, for example, when node device 302 is a newer node device that supports multiple communication modes with higher operating parameters, while node device 306 is a legacy node device that supports fewer communication modes than node device 302, such as only supporting operating in the default mode. In such instances, node device 304 may support transmission of packets respectively, over communication links 312, 314 using different communication modes for the respective communication channels. In some embodiments, communication node device 304 may send separate updated channel masks that identify the respective communications channels that are to be used for the respective communication links 312, 314.

Once the discovery process has completed, communication node device 304 initiates normal operations. In the course of normal operations, communication node device 304 implements channel hopping across a repeating sequence of time slots. While channel hopping, node device 304 transmits and/or receives data at specific times within these time slots.

In some embodiments, node device 304 may switch to a different communication mode. In such instances, node device 304 may operate using the currently-selected communication mode ("current mode"), where communication link 312 uses a specific channel plan 332 and specific channel(s) for the current mode. In various embodiments, the current mode may be source-specific and/or destination-specific. In various embodiments, mode control application 242 may determine to switch from the current mode to a preferred communication mode to transfer data packets. In some embodiments, mode control application 242 may also determine to switch back to either the current mode or the default mode once the data packets are transferred. In such instances, mode control application 242 may send a message to node device 302 that specifies the sequence of mode switches that are to occur and corresponding channel masks such that node device 302 switches to the applicable mode and applicable communication channels when communicating with node device 304.

In various embodiments, communication node device 304 may generate a custom channel mask that is based on an existing channel plan by applying channel bonding usage. In such instances, communication node device 304 could generate a custom channel mask to modify an existing channel plan to have different operating characteristics. For example, a first channel plan could have a center channel frequency of 902.4 MHz with 200 kHz channel spacing, while a second channel plan could have a center channel frequency of 903 MHz with 400 kHz channel spacing. Communication node device 304 could, in lieu of selecting the second channel plan for use, generate a custom channel mask for the first channel plan, where applying the custom channel mask enforces 400 kHz channel spacing (e.g., the custom channel mask identifying channels at 200 kHz, 600 kHz, 1000 kHz from the center channel frequency as unavailable). In such instances, communication node device 304 could operate using the center channel frequency of the first channel plan while providing more options for operating modes available to communication node device 304, such as when the operating region has limited available spectrum.

In various embodiments, communication node device 304 may update the preferred communication modes used for the communication link 312 with neighboring communication node device 302. For example, communication node device 304 could, for each supported mode, update the data success rate, recalculate metric values, and/or reselect the preferred communication mode for each respective communication link 312, 314. In some embodiments, mode control application 242 included in communication node device 304 may periodically perform updates, such as at a regular interval, or upon receiving instructions from back office system 310. In some embodiments, mode control application 242 may perform updates any time the data success rate for a given communication mode is updated, which may occur following any data message exchange with any neighboring communication node device (e.g., node device 302 and/or node device 306).

In some embodiments, the initiator (e.g., communication node device 304) of communications between two communication node devices 302, 304 may select the communication mode and channel to be used for the transmission of data packets. In another embodiment, the transmitter of a data message (e.g., node device 302) may select the communication mode and channel for the next packet that it transmits. In other embodiments, the recipient (e.g., node device 306) of a packet may select the communication mode and channel that the neighboring communication node device (e.g., node device 304) should use for its next transmission over the applicable communication link 314.

In some embodiments, mode control application 242 may remove, from the local mode table, any communication mode that is not supported by any neighboring communication node device. For example, once communication node device 304 completes discovery with all neighboring node devices, mode control application 242 could identify, in the local mode table, any communication mode that is not supported by any of the neighboring node devices 302, 304. In such instances, mode control application 242 could remove such communication modes from the local mode table. In some instances, mode control application 242 could add or rearrange the remaining modes in the mode table using any suitable criteria, such as based on signal-to-noise ratio (SNR).

FIG. 4A illustrates contents of a capabilities information element (IE) generated by a communication node device within the network system of FIG. 1, according to various embodiments. As shown, capabilities information element (IE) 400 includes mode table 401 that includes mode identifier field 410, data rate field 420, and modulation field 430. Mode table 401 includes a plurality of entries for specific communication modes 402 (e.g., 402-1 to 402-11).

In operation, a node device (e.g., node device 112, 114, 116, 210, 302, 304, 306, etc.) includes one or more capabilities information elements (IEs) in a message that is received by other node devices within the PAN, where the information element includes communication mode information in the body, such as fields for one or more channel plans 332 and/or channel masks 334. For example, a communication node device 304 could send a default channel mask as a field in a capabilities information element and later receive a separate information element that includes an updated channel mask as a field. Additionally or alternatively, the node device may include other data structures (e.g., TLV sequences of supported channel plans 332, bit sequences specifying channel masks 334, etc.) in messages received by other node devices. For example, a channel plan ID for a channel plan 332 and/or a channel mask 334 may be included in a header of a message sent to communication node device 304.

In various embodiments, mode control application 242 may include capabilities IE 400 and/or mode table 401 in one or more configuration frames (e.g., a PAN configuration frame) that is received by neighboring communication node device 302. Additionally or alternatively, communication node 304 may be assigned a channel plan ID and/or an operating mode ID based on the data rate supported by communication node device 304. For example, when communication node 304 supports a 300 Kbps data rate, communication node device 304 may be assigned mode ID #8.

In various embodiments, mode control application 242 may include capabilities IE 400 and/or mode table 401 in discovery frames or discovery messages that are transmitting during the discovery phase. Similarly, a node device may receive a discovery frame or discovery message from one or more neighboring node devices that includes a capabilities IE associated with the neighboring node device. In various embodiments, node device 304 may extract the capabilities IE from a received message and mode control application 242 may compare the contents of capabilities IE 400 and/or mode table 401 to a locally-stored mode table. In various embodiments, mode control application 242 may update the locally-stored mode table to reflect the set of communication modes that are supported by neighboring node devices.

Capabilities IE 400 specifies details of each communication mode that is supported by a given node device. In various embodiments, mode control application 242 may, based on each capabilities IE 400, update a local mode table to reflect the communication modes supported by each neighboring node device. Mode control application 242 may then generate a common mode set for a neighboring node device in order to determine a preferred mode when data packets are transmitted between the node device and the neighboring node device.

In various embodiments, the discovery phase is a specific period known to each node device. For example, node device 304 could include capabilities IEs 400 in a periodic discovery frame. In some embodiments, the discovery phase may be a specific state. For example, the discovery phase could be a specific state, such as a join state 1 or a join state 3, that enables multi-data-rate communication between node device 304 and a neighboring communication node device 302. During the discovery phase, node device 304 may add one or more capabilities IEs 400 in the payload of messages that are transmitted to other node devices within network 300. Capabilities IE 400 describes the RF capabilities of node device 304. Similarly, neighboring communication node device 302 includes one or more capabilities IEs in messages that are received by node device 304, where such capabilities IEs describe the RF capabilities of neighboring node device 304.

In various embodiments, a given capabilities IE 400 describes modulations, data rates, channel spacing, and/or frequencies supported on node device 304. In such instances, when attempting to establish a communication link 312 with neighboring communication node device 302, node device 304 may refer to information included in the received capabilities IE 400 and/or the local mode table updated with information from the received capabilities IE 400 in order to identify additional communication modes that are available for linking to the linked device. In some embodiments, mode control application 242 may select a preferred communication mode from the communication modes that are listed in a received capabilities IE.

For example, a neighboring communication node device 306 may refer to a set of channel plan characteristics when generating a capabilities IE, where the neighboring communication node device 306 includes applicable channel plan characteristics for the operating region that communication node device 304 and the neighboring communication node device 306 occupy.

Table 3 shows a set of channel parameters for frequency bands in different operating regions. In various embodiments, a neighboring communication node device 306 may exchange the capabilities of the neighboring communication node device 306, such as specifying the communication modes that the neighboring communication node device 306 supports, and including the supported communication modes in the capabilities IE.

TABLE 3

Channel Parameters for Multiple Operating Regions

| Frequency Band (MHz) | Region ID | PHY Mode ID | Channel Plan ID | Total Number of Channels |
|---|---|---|---|---|
| 902-928 | 1 | 153 to 155 | 19 | 30 |
| 902-907.5, 915-928 | 2 | 130 to 134 | 4 | 20 |
| | | 138 to 141 | 3 | 31 |
| | | 146 to 148 | 2 | 64 |
| | | 153 to 155 | 1 | 129 |
| 863-870 | 3 | 128 to 134 | 4 | 13 |
| | | 138 to 141 | 3 | 21 |
| | | 146 to 148 | 2 | 45 |
| | | 153 to 155 | 1 | 91 |
| 870-876 | 4 | 138 to 141 | 8 | 9 |
| | | 146 to 148 | 7 | 18 |
| | | 153 to 155 | 6 | 37 |

In some embodiments, capabilities IE 400 may be encoded as a bit string of a specified size (e.g., 64 bits), where a "1" in the bit string indicates support for a mode, and "0" indicates that a mode is not supported. For example, mode table 401 could be a mode data table included in capabilities IE 400 that indicates identifiers 410, the data rates 420 and modulation schemes 430 for different communication modes that are supported by node device 304. Other operating parameters (e.g., channel spacing, frequencies supported, etc.) and/or metric values associated with a given communication mode may also be included mode table 401.

In various embodiments, mode control application 242 may select the preferred communication mode based on one or more metrics. For example, mode control application 242 could select communication mode 402-11 as the preferred communication mode because the communication mode uses the highest data rate (e.g., 2.4 Mbps) when transferring data packets. In some embodiments, the channel plan 332 in use by network 300 in which communication node device 304 is located may invalidate one or more communication modes included in mode table 401. In such instances, mode control application 242 could select a different communication mode supported by channel plan 332, such as communication mode 402-4, which has operating parameters of a binary frequency-shift keying (2FSK) modulation scheme and a 300 Kbps data rate.

FIG. 4B illustrates contents a mode shift information element generated by a node device within the network system of FIG. 1, according to various embodiments. As shown, mode shift information element (IE) 440 includes mode table 441 that has mode-in-use field 450 and mode identifier 460. Mode table 441 specifies a set of communication modes 442 (e.g., 442-1 to 442-3) that are to be used in a shift to transfer data packets between neighboring node devices.

In various embodiments, mode control application 242 may generate mode shift IE 440, which describes one or more RF modes and/or describes a channel plan 332 that is to be used for communication with communication node device 304. For example, mode control application 242 could generate mode shift IE 440 for inclusion with data messages and acknowledgement frames in order to direct a neighboring communication node device 306 to switch to another preferred communication mode at the conclusion of processing a data message or processing an acknowledgement message. In such instances, the two node devices initially shift to the preferred communication mode and then switch to a separate communication mode that is not the default mode. In some embodiments, communication node device 304 may include the channel plan ID and/or the mode ID in the mode shift IE before shifting into a different mode. In such instances, including such information improves network performance by, for example, supporting higher network bandwidth and throughput. Additionally or alternatively, the mode shift IE may be included in an upper layer application data (ULAD) frame when targeting the linked node device.

In various embodiments, mode shift IE 440 may be included in a mode sampling frame transmitted by communication node device 304. For example, communication node device 304 may add a mode sampling frame in messages to the neighboring communication node device 306 in order to transition to a new communication mode for packet exchange and/or metric collection. In such instances, the mode sampling frame indicates that once the packet exchange and/or metric collection is complete, the neighboring communication node device 306 is to transition back to the current mode employed by the linked node device when the linked node device received the mode sampling frame. In some embodiments, communication node device 304 may initiate mode sampling via unicast, where communication node device 304 transmits to neighboring communication node devices 302, 306 in default mode during a unicast listening schedule. In some embodiments, communication node device 304 may elect to use a mode sampling frame that includes mode shift IE 440. In such instances, node device 304 may target only neighboring node devices that have received capabilities IE 400 sent by node device 304.

In various embodiments, mode control application 242 may generate mode shift IE 440 that specifies a set of one or more selected communication modes and/or an associated channel plan 332. In some embodiments, mode control application 242 may select the set of supported communication modes from a common mode set of modes that are supported by both node device 304 and neighboring communication node device 302, where a received capabilities IE 400 specified the communication modes supported by neighboring communication node device 302.

In some embodiments, the set of selected modes as specified in mode shift IE 440 are legal in the channel plan 332 such that each of the selected modes may be used as a group for communication link 312. In some embodiments, one of the selected RF modes may be the default mode for the PAN. In some embodiments, the default mode may be the same for all devices included in the PAN. Additionally or alternatively, the current mode may be the mode in use last. In such instances, mode control application 242 may select the remaining communication modes based on the capabilities of the neighboring node device, signal-to-noise (S/N) characteristics for the selected communication modes, and/or channel spacing. For example, node device 304 could retrieve metrics associated with a set of supported modes. In such instances, node device 304 could determine theoretical S/N characteristics for groupings of available communication modes in order to determine one or more communication modes to select.

In some embodiments, mode shift IE 440 may include an optional field (not shown) that indicates one of the selected modes that is to be used in a following mode sampling frame. As shown, for example, mode table 441 lists a set of supported modes that includes default mode 442-1, current mode 442-2, and preferred mode 442-3. Mode shift IE 440 could also include a field specifying that the node device is to switch to current mode 442-2. Neighboring communication node device 302, upon acknowledgement of receiving mode shift IE 440, switches from current mode 442-2 (e.g., where neighboring communication node device 302 is presently operating using the current mode) to preferred mode 442-3 for the transmission of data packets, then switches back to current mode 442-2.

In various embodiments, mode shift IE 440 may be included in a mode transition frame. For example, communication node device 304 could add a mode transition frame in messages to neighboring communication node device 302 in order to switch to a new current mode, or switch to an existing current mode. When mode shift IE 440 is included in a mode transition frame, mode shift IE 440 lists the default mode, as well as a new current mode (or an existing current mode) to which neighboring communication node device 302 is to switch upon a transition. In some embodiments, node device 304 may initiate a mode transition via unicast, where node device 304 transmits the mode transition frame in default mode to neighboring communication node device 302 during a unicast listening schedule, and node device 304 elects to use the mode transition frame. In such instances, node device 304 may target only those neighboring node devices that have received capabilities IE 400 sent by node device 304.

In some embodiments, after transitioning to the new current mode (or existing current mode), the remaining exchange between node device 304 and neighboring communication node device 302, including acknowledgements and/or responses from neighboring communication node device 302, may continue in the new current mode. Such communications may continue until node device 304 transmits a final mode transition frame to neighboring node device 304, where the final mode transition frame indicates that neighboring communication node device 302 is to transition to the default mode. In some embodiments, the listening schedule of neighboring communication node device 302 may cause neighboring communication node device 302 to return to the default mode without receiving the final mode transition frame.

In some embodiments, communication node device 304 may send a mode sampling frame to neighboring communication node device 302 and may receive a response that includes metric values associated with the specific communication mode listed in mode shift IE 440. In such instances, both node device 304 and neighboring communication node device 302 will both return to default mode 442-1 upon exchange of the mode sampling frame and the response.

In various embodiments, mode control application 242 may generate a mode sampling metrics information element that provides metrics obtained from one or more mode sampling frames. For example, node device 304 may perform mode sampling as an ongoing process after a discovery phase (e.g., when capabilities IE 400 is detected and/or received). Node device 304 could collect various metric values in order to determine whether to change the current mode and/or reselect a preferred communication mode. For example, mode control application 242 could abstain from switching the current mode unless another mode provides an improvement of 25% or more.

In some embodiments, node device 304 may receive a mode sampling frame that directs node device 304 to switch to a specific communication mode at the conclusion of processing a data message and/or an acknowledgement message, where node device 304 is to sample the specific communication mode. In various embodiments, subsequent data messages may be directed to node device 304 using a preferred communication mode that corresponds to the specific communication mode. In such instances, node device 304 may sample the specific communication mode using one or more ULAD frames and/or may generate metric values for the specific mode. Node device 304 may then generate a response acknowledgement that includes the mode sampling metrics IE. The mode sampling metrics IE may include signal quality metrics, such as the received signal strength indicator (RSSI) of a received ULAD frame. In some embodiments, node device 304 may send the response acknowledgement in the specific communication mode that was sampled.

Figure 5:
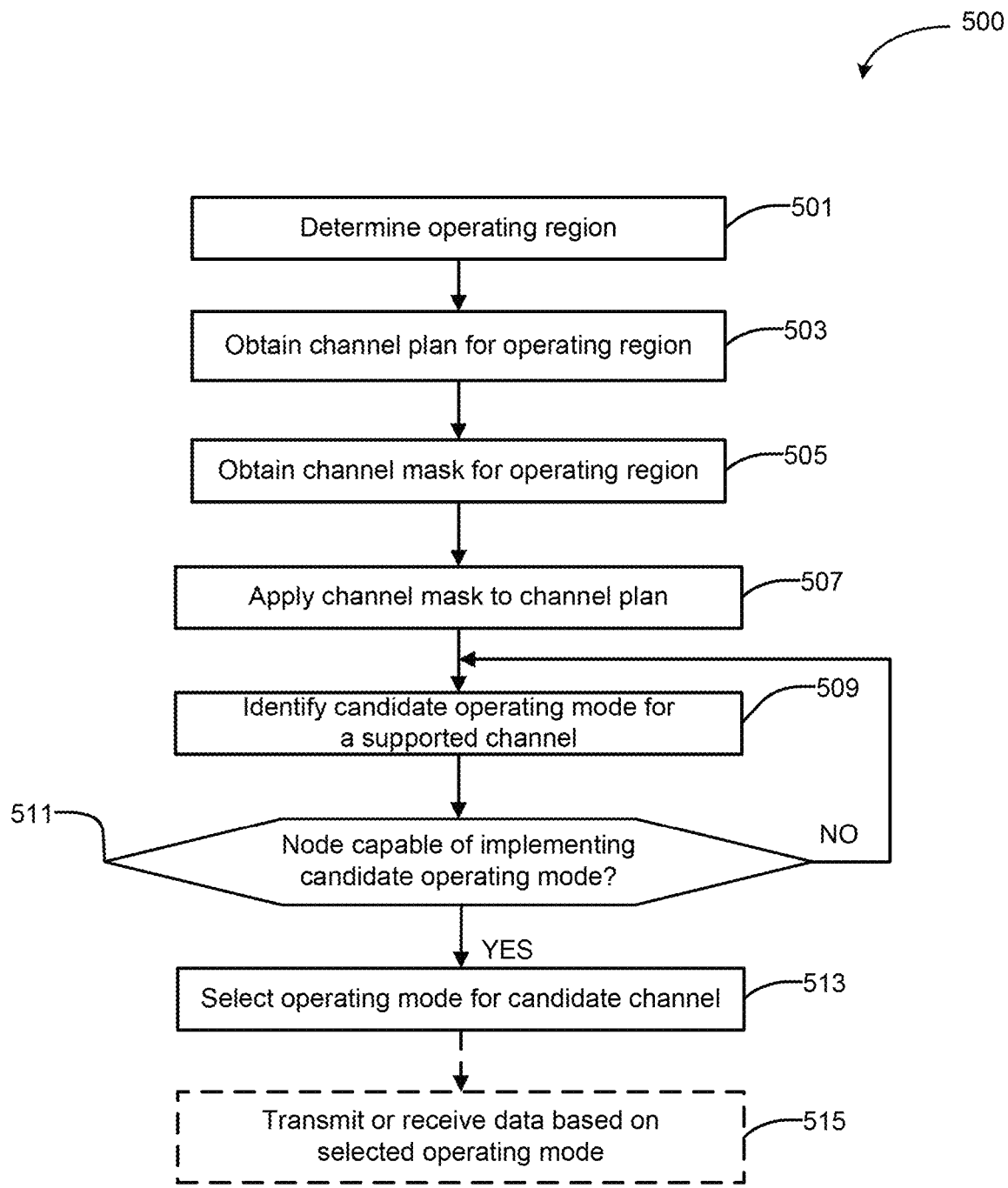
FIG. 5 is a flow diagram of method steps for transmitting data between node device devices in a network system, according to various embodiments.

FIG. 5 is a flow diagram of method steps for transmitting data between node device devices in a network system, according to various embodiments. Although the method steps are described with reference to the systems and call flows of FIGS. 1-4B, persons skilled in the art will understand that any system configured to implement the method steps, in any order, falls within the scope of the present disclosure.

Method 500 begins at step 501, where a communication node device 304 determines the operating region. In various embodiments, communication node device 304 may, during startup, receive a packet with a header that region ID that identifies the operating region in which communication device 304 is located. In some embodiments, communication node device 304 may receive information from back end office system 310 that specifies the operating region of the network 300 to which communication node device 304 is located. In such instances, communication node device 304 may determine a set of potential communication modes by referring to channel plans 332 and/or channel masks 324 associated with the operating region.

At step 503, communication node device 304 acquires one or more channel plans 332 for the operating region. In various embodiments, mode control application 242 included in communication node device 304 may acquire one or more channel plans 332 that are associated with the region ID acquired in step 501. For example, communication node device 304 may locally store a channelization table that includes sets of channel plans 332 for multiple operating regions. In such instances, mode control application 242 may load one or more channel plans that are associated with the region ID. In some embodiments, communication node device 304 may receive messages that include the channel plans 332 for the operating region. In such instances, communication node device 304 may store the channel plans locally in order to select communication modes to use when communicating with neighboring node devices.

At step 505, communication node device 304 obtains a channel mask for the operating region. In various embodiments, mode control application 242 may obtain one or more channel masks 334 that are associated with the operating region that specifies which specific channels in a given channel plan are in use. For example, communication node device 304 could initially retrieve a default channel mask from local storage, and may later receive a channel mask-specific information element that includes an updated channel mask. In various embodiments, communication node device 304 may retrieve channel mask 334 from local storage separately from one or more channel plans 332, or from another device within network 300. In some embodiments, the channel plan 332 and channel mask 334 be retrieved as a combination. For example, mode control application 242 may retrieve, from a channelization table, an entry that includes channel plan characteristics specifying the channel plan 332, as well as channel utilization characteristics specifying the channel mask 334.

At step 507, communication node device 304 applies the channel mask 322 to the channel plan 332 for the operating region. In various embodiments, mode control application 242 identifies the specific channel plan 332 that corresponds to the obtained channel mask 334 and applies the channel mask 334 to the specific channel plan 332 in order mask the channels within the specific channel plan 332 that are not in use within the specific operating region. Applying the channel mask 334 on the channel plan 332 identifies a set of one or more channels within the channel plan 332 that are in use within the operating region. In such instances, mode control application 242 may select the channel to use when communicating with neighboring communication node devices 302, 306. In some embodiments, communication node device 304 may initially apply a default channel mask to select an initial channel for use and later apply an updated channel mask in order to select a channel from an updated set of available channels.

At step 509, communication node device 304 selects a candidate operating mode for a supported channel in the channel plan. In various embodiments, mode control application 242 identifies a specific candidate channel from the set of one or more channels that are available after applying the channel mask 334. Mode control application 242 may then determine an operating mode corresponding to communicating with neighboring devices using the candidate channel.

At step 511, communication node device 304 determines whether communication node device 304 is capable if implementing the candidate operating mode. In various embodiments, mode control application 242 compares the characteristics of the operating mode with a set of communication modes and/or operating modes supported by communication node device 304. In some embodiments, communication node device 304 may store a mode table that lists a set of communication modes and/or operating modes that communication node device 304 supports for transferring data packets. In such instances, mode control application 242 may compare the set of communication modes supported by node device 304 with the candidate operating mode to determine whether to use the candidate operating mode. When mode control application 242 determines that the candidate operating mode is not supported, communication node device 304 returns to step 509 to select another candidate operating mode. Otherwise, when mode control application 242 determines that the candidate operating mode is supported, communication node device 304 proceeds to step 513.

At step 513, communication node device 304 selects the candidate operating mode. In various embodiments, mode control application 242, upon determining that the candidate operating mode is supported by communication node device 304 in step 511, selects the candidate operating mode to user when for later transmitting and receiving data packets between communication node device 304 and neighboring communication node device 302. In such instances, both communications node devices 302, 304 use the communication mode corresponding to the selected operating mode to transfer data packets via communication link 312.

In some embodiments, communication node device 304 may transmit a message specifying the selected operating mode to the neighboring node device. In such instances, mode control application 242 may generate a message that includes an updated channel mask that is to be applied to the channel plan and is to be applied when selecting and available channel to use when transferring data packets between communication node device 304 and neighboring communication node device 302.

At step 515, communication node device 304 and neighboring communication node device 302 may optionally transmit data packets while using the selected operating mode. In various embodiments, upon communication node device 304 transmitting a message that specifies the applicable communication mode, neighboring communication node device 302 may schedule to operate using the specified communication modes in order to facilitate the transfer of data packets between communication node device 304 and neighboring communication node device 302. For example, neighboring communication node device 302 could be a sender that sends transfer data packets to communication node device 304 using the applicable communication mode. In another example, neighboring communication node device 302 may be a recipient that switches to the communication mode specified by communication node device 304 in order to receive one or more data packets from communication node device 304.

In sum, a mode control application in a communication node device of a mesh network incorporates various optimized channelization techniques in order to determine channels that are supported and are in use in a given operating region. In various embodiments, the mode control application acquires one or more channel plans for the operating region, where the channel plan defines the operating modes and characteristics of a communication mode that uses one or more channels within the operating region. The mode control application also acquires a channel mask for the operating region, which identifies which specific channels within a given channel plan are in use within the operating region. The mode control application applies the channel mask for the operating region to a corresponding channel plan in order to mask the channels that are not in use within the operating region. The mode control application generates a set of candidate channels that are in use within the operating region and determines one or more operating modes corresponding to communicating with neighboring node devices using at least one of the candidate channels. The mode control application determines an operating mode that is supported by the communication node device and which corresponds to one of the candidate channels that are in use within the operating region.

The mode control application then selects an operating mode and uses the operating mode to communicate with neighboring communication node devices using the available channel. The mode control application generates an updated channel mask associated with the selected operating mode and transmits a message including the updated channel mask. When a neighboring communication node receives the message, the neighboring communication node may apply the updated channel mask to identify an updated set of available channels to communicate with the communication node device.

One technological advantage of the disclosed approach relative to the prior art is that the channelization for a given operating region does not need to be redefined as new communication modes and operating modes are introduced into a given region. In particular, by maintaining and updating channel masks that are applicable to a specific operating region, a communication node device can determine specific channels and operating modes to use within a specific operation region without needing to redefine channel plans or continually download more complex channel plan information.

Further, applying a separate channel mask enables a communication node device to maintain channel plan information for multiple operating regions while efficiently selecting specific channels and communication modes that are currently in use in a specific operating region. Maintaining such channelization information enables communication node devices to be implemented in a broad range of locations without requiring a large investment in initial setup. Accordingly, the overall operating efficiency of the mesh network can be substantially increased relative to conventional mesh networks. These technical advantages provide one or more technological advancements over prior art approaches.

1. In various embodiments, a computer-implemented method for transmitting data between node devices in a mesh network comprises acquiring, by a first node device within the mesh network that supports a set of channel plans, a channel mask that specifies a set of channels that are available for a channel plan within an operating region associated with the mesh network, determining, based on the channel mask, a set of available channels supported by the first node device, selecting, from the set of available channels, at least one channel as a first preferred channel for data transmissions between the first node device and a second node device included in the mesh network, and configuring, based on the first preferred channel, a communication link between the first node device and the second node device.

2. The computer-implemented method of clause 1, further comprising generating a selection message that includes the channel mask, transmitting the selection message to the second node device, and transmitting a first data packet from the first node device to the second node device via the communication link.

3. The computer-implemented method of clause 1 or 2, where determining the set of available channels further comprises applying the channel mask to a corresponding channel plan associated with the operating region, wherein the channel mask identifies at least one channel included in the channel plan as unavailable in the operating region.

4. The computer-implemented method of any of clauses 1-3, where the channel plan is included in a channelization table stored in the first node device.

5. The computer-implemented method of any of clauses 1-4, further comprising determining a first operating parameter included in a first set of operating parameters associated with the first preferred channel, determining a second operating parameter included in a second set of operating parameters associated with a second channel plan, determining that the second operating parameter is greater than the first operating parameter, and in response to determining that the second operating parameter is greater than the first operating parameter, acquiring a second channel mask that specifies a second set of channels that are available for the second channel plan within the operating region.

6. The computer-implemented method of any of clauses 1-5, further comprising generating a transition message that includes the second channel mask, and transmitting the transition message to the second node device.

7. The computer-implemented method of any of clauses 1-6, further comprising acquiring a region identifier associated with the operating region, where at least one of the channel plan or the channel mask is associated with the region identifier.

8. The computer-implemented method of any of clauses 1-7, where configuring the communication link comprises configuring the communication link based on a set of operating parameters associated with the channel, and the set of operating parameters includes at least one of: a modulation scheme, a channel spacing group, a center frequency, or a set of supported frequencies.

9. The computer-implemented method of any of clauses 1-8, where the channel mask is further associated with a second channel plan within a second operating region, and the channel mask masks a first channel in the channel plan in the operating region and does not mask the first channel in the second channel plan in the second operating region.

10. The computer-implemented method of any of clauses 1-9, further comprising determining a first operating parameter included in a first set of operating parameters associated with the first preferred channel, determining a second operating parameter included in a second set a second set of operating parameters associated with a second channel plan, and generating a second channel mask that specifies a second set of channels that are available for the first channel plan within the operating region, where the second set of channels are based on the second operating parameter for the second set of operating parameters associated with the second channel plan.

11. In various embodiments, one or more non-transitory computer-readable storage media storing instructions that, when executed by one or more processors, cause the one or more processors to transmit data between node devices in a mesh network by performing the steps of acquiring, by a first node device within the mesh network that supports a set of channel plans, a channel mask that specifies a set of channels that are available for a first channel plan within an operating region associated with the mesh network, determining, based on the channel mask, a set of available channels supported by the first node device, selecting, from the set of available channels, at least one channel as a first preferred channel for data transmissions between the first node device and a second node device included in the mesh network, and configuring, based on the first preferred channel, a communication link between the first node device and the second node device.

12. The one or more non-transitory computer-readable storage media of clause 11, further storing instructions that, when executed by the one or more processors, cause the one or more processors to perform the step of transmitting a transition message that specifies a switch from the first preferred channel to a second channel included in a second channel plan, wherein the transition message includes a second channel mask for the second channel plan within the operating region.

13. The one or more non-transitory computer-readable storage media of clause 11 or 12, where the first node device stores a channelization table that includes the channel plan, and at least a second channel plan associated with a second operating region.

14. The one or more non-transitory computer-readable storage media of any of clauses 11-13, further storing instructions that, when executed by the one or more processors, cause the one or more processors to perform the steps of generating a selection message that includes the channel mask, transmitting the selection message to the second node device, and transmitting a first data packet from the first node device to the second node device via the communication link.

15. The one or more non-transitory computer-readable storage media of any of clauses 11-14, further storing instructions that, when executed by the one or more processors, cause the one or more processors to perform the step of acquiring a region identifier associated with the operating region, where at least one of the channel plan or the channel mask is associated with the region identifier.

16. The one or more non-transitory computer-readable storage media of any of clauses 11-15, where the channel mask is further associated with second channel plan within a second operating region, the channel mask masks a first channel in the channel plan in the operating region, and the channel mask does not mask the first channel in second channel plan in the second operating region.

17. In various embodiments, a system comprises a first node device that resides within a mesh network in an operating region and supports a set of channel plans, a second node device that resides within the mesh network, and a communication link between the first node device and the second node device, where the first node device performs the steps of acquiring a channel mask that specifies a set of channels that are available for a first channel plan within the operating region, determining, based on the channel mask, a set of available channels supported by the first node device, selecting, from the set of available channels, at least one channel as a first preferred channel for data transmissions between the first node device and the second node device, and configuring, based on the first preferred channel, a communication link between the first node device and the second node device.

18. The system of clause 17, where the first node device transmits a message identifying the first preferred channel and the channel mask to the second node device.

19. The system of clause 17 or 18, where the first node device includes a memory that stores a mode control application, and a first set of operating parameters associated with the first channel plan, and a processor that executes the mode control application to select the first preferred channel by performing the steps of determining that the first node device is capable of supporting the first set of operating parameters, determining that the channel mask corresponds to the first channel plan, and applying the channel mask to the channel plan, wherein the channel mask identifies at least one channel in the first channel plan as unavailable in the operating region.

20. The system of any of clauses 17-19, where the memory stores the channel mask for the first channel plan within the operating region as a default mask.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:
retrieving, by a node within a mesh network, a plurality of channel masks, including a first channel mask associated with a first operating region, the first operating region being different from a second operating region associated with a second channel mask, wherein the node supports a set of channel plans;
selecting, by the node from the plurality of channel masks, the first channel mask, wherein the first channel mask:
identifies a plurality of channels available to a first channel plan within the first operating region,
masks a first channel in the first channel plan in the first operating region, is associated with a second channel plan within the second operating region, and does not mask the first channel in the second channel plan in the second operating region;

determining, by the node by applying the first channel mask to the first channel plan, a subset of available channels supported by the node;

selecting, by the node from the subset of available channels, at least one channel as a first preferred channel for data transmissions between the node and a neighboring node within the first operating region; and configuring, by the node and based on the first preferred channel, a communication link between the node and the neighboring node.

2. The method of claim 1, further comprising:
generating, by the node, a selection message that includes the first channel mask;
transmitting, by the node, the selection message to the neighboring node; and
transmitting, by the node, a first data packet from the node to the neighboring node via the communication link.

3. The method of claim 1, wherein the first channel mask identifies at least one channel included in the first channel plan as unavailable in the first operating region.

4. The method of claim 3, wherein the first channel plan is included in a channelization table stored in the node.

5. The method of claim 1, further comprising:
determining, by the node, a first operating parameter included in a first set of operating parameters associated with the first preferred channel;
determining, by the node, a second operating parameter included in a second set of operating parameters associated with the second channel plan;
determining, by the node, that the second operating parameter is greater than the first operating parameter; and
in response to determining that the second operating parameter is greater than the first operating parameter, retrieving, by the node, a third channel mask from the plurality of channel masks, the third channel mask identifying a second set of channels that are available for the second channel plan within the first operating region.

6. The method of claim 5, further comprising:
generating, by the node, a transition message that includes the third channel mask; and
transmitting, by the node, the transition message to the neighboring node.

7. The method of claim 1, further comprising acquiring, by the node, a first region identifier associated with the first operating region, wherein the first channel mask is associated with the first region identifier.

8. The method of claim 1, wherein:
configuring the communication link comprises configuring the communication link based on a set of operating parameters associated with the first preferred channel, and
the set of operating parameters includes at least one of: a modulation scheme, a channel spacing group, a center frequency, or a set of supported frequencies.

9. The method of claim 1, further comprising:
determining, by the node, a first operating parameter included in a first set of operating parameters associated with the first preferred channel;
determining, by the node, a second operating parameter included in a second set of operating parameters associated with the second channel plan; and generating, by the node, a third channel mask that identifies a second set of channels that are available for the first channel plan within the first operating region,
wherein the second set of channels is based on the second operating parameter for the second set of operating parameters associated with the second channel plan.

10. One or more non-transitory computer-readable storage media storing instructions that, when executed by one or more processors of a first node device within a mesh network, cause the one or more processors to perform the steps of:
retrieving, by a node within a mesh network, a plurality of channel masks, including a first channel mask associated with a first operating region, the first operating region being different from a second operating region associated with a second channel mask, wherein the first node device supports a set of channel plans;
selecting, by the node from the plurality of channel masks, the first channel mask, wherein the first channel mask:
identifies a plurality of channels available to a first channel plan within the first operating region,
masks a first channel in the first channel plan in the first operating region,
is associated with a second channel plan within the second operating region, and
does not mask the first channel in the second channel plan in the second operating region;
determining, by the node by applying the first channel mask to the first channel plan, a subset of available channels supported by the first node device;
selecting, by the node from the subset of available channels, at least one channel as a first preferred channel for data transmissions between the first node device and a neighboring node device within the first operating region; and
configuring, based on the first preferred channel, a communication link between the first node device and the neighboring node device.

11. The one or more non-transitory computer-readable storage media of claim 10, further storing instructions that, when executed by the one or more processors, cause the one or more processors to perform the step of:
transmitting a transition message that specifies a switch from the first preferred channel to a second channel included in the second channel plan,
wherein the transition message includes a third channel mask of the plurality of channel masks, and
the third channel mask is associated with the second channel plan within the first operating region.

12. The one or more non-transitory computer-readable storage media of claim 10, wherein the first node device stores a channelization table that includes the first channel plan and at least the second channel plan associated with the second operating region.

13. The one or more non-transitory computer-readable storage media of claim 10, further storing instructions that, when executed by the one or more processors, cause the one or more processors to perform the steps of:
generating a selection message that includes the first channel mask;
transmitting the selection message to the neighboring node device; and
transmitting a first data packet to the neighboring node device via the communication link.

14. The one or more non-transitory computer-readable storage media of claim 10, further storing instructions that, when executed by the one or more processors, cause the one or more processors to perform the step of acquiring a first region identifier associated with the first operating region, wherein the first channel mask is associated with the first region identifier.

15. A system, comprising:
a first node that resides within a mesh network in a first operating region and supports a set of channel plans, the first node including (i) a computer processor; and (ii) a computer-readable memory storing executable instructions that, when executed by the computer processor, cause the first node to perform operations comprising:
retrieving a plurality of channel masks, including a first channel mask associated with a first operating region, the first operating region being different from a second operating region associated with a second channel mask;
selecting, from the plurality of channel masks, the first channel mask, wherein the first channel mask:
identifies a plurality of channels available to a first channel plan within the first operating region,
masks a first channel in the first channel plan in the first operating region,
is associated with a second channel plan within the second operating region, and
does not mask the first channel in the second channel plan in the second operating region,
determining, by applying the first channel mask to the first channel plan, a subset of available channels supported by the first node,
selecting, from the subset of available channels, at least one channel as a first preferred channel for data transmissions between the first node and a second node that resides within the first operating region, and
configuring, based on the first preferred channel, a communication link between the first node and the second node.

16. The system of claim 15, wherein the operations further comprise transmitting a message identifying the first preferred channel and the first channel mask to the second node.

17. The system of claim 15, wherein:
the memory further stores a mode control application, and a first set of operating parameters associated with the first channel plan; and
the computer processor executes the mode control application to cause the first node to select the first preferred channel by performing operations comprising:
determining the first node is capable of supporting the first set of operating parameters, and
determining the first channel mask corresponds to the first channel plan, and
wherein the first channel mask identifies at least one channel in the first channel plan as unavailable in the first operating region.

18. The system of claim 17, wherein the memory stores the first channel mask as a default mask for the first channel plan within the first operating region.

* * * * *